United States Patent
Mullin et al.

(10) Patent No.: US 11,244,042 B2
(45) Date of Patent: Feb. 8, 2022

(54) SYSTEMS AND METHODS FOR ZERO-FOOTPRINT EMAIL AND BROWSER LIFECYCLE

(71) Applicant: JPMorgan Chase Bank, N.A., New York, NY (US)

(72) Inventors: Andrew J. Mullin, Cypress, TX (US); Hai Van Nguyen, Houston, TX (US); Nicholas R. Adam, The Woodlands, TX (US); Jason S. Thacker, Cypress, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 342 days.

(21) Appl. No.: 16/353,261

(22) Filed: Mar. 14, 2019

(65) Prior Publication Data
US 2020/0293649 A1    Sep. 17, 2020

(51) Int. Cl.
*G06F 21/53* (2013.01)
*G06F 21/57* (2013.01)

(52) U.S. Cl.
CPC ............ *G06F 21/53* (2013.01); *G06F 21/577* (2013.01); *G06F 2221/033* (2013.01); *G06F 2221/2149* (2013.01)

(58) Field of Classification Search
CPC ....... G06F 21/50–577; G06F 2221/033; G06F 2221/2149
See application file for complete search history.

(56) References Cited

U.S. PATENT DOCUMENTS

| | | | | |
|---|---|---|---|---|
| 5,974,549 | A * | 10/1999 | Golan | G06F 9/468 714/47.3 |
| 8,176,321 | B1 * | 5/2012 | Perry | H04L 67/2819 713/167 |
| 9,292,701 | B1 * | 3/2016 | Chebakov | H04L 63/168 |

(Continued)

FOREIGN PATENT DOCUMENTS

WO    2014151061    9/2014

OTHER PUBLICATIONS

Radhakrishnan, Manigandan, and Jon A. Solworth. "Quarantining untrusted entities: Dynamic sandboxing using LEAP." Twenty-Third Annual Computer Security Applications Conference (ACSAC 2007). IEEE, 2007. (Year: 2007).*

(Continued)

*Primary Examiner* — Madhuri R Herzog
(74) *Attorney, Agent, or Firm* — Greenberg Traurig LLP

(57) ABSTRACT

Systems and methods for zero-footprint email and browser lifecycle, dependency, and configuration management are disclosed. In one embodiment, in an information processing apparatus comprising at least one computer processor, a method for implementing zero-footprint email and browser lifecycle management may include: (1) launching a restricted sandbox with no dependencies installed; (2) executing an email client or browser session with no dependencies in the restricted sandbox; (3) receiving a request for a dependency from the email client or browser; (4) halting initialization of the request; (5) validating the request; (6) retrieving an approved configuration for the dependency; (7) resuming initialization of the request; and (8) destroying contents of the restricted sandbox when the email client or browser session is complete.

20 Claims, 2 Drawing Sheets

(56) References Cited

U.S. PATENT DOCUMENTS 9,785,772 B1 * 10/2017 Johansson ............... G06F 21/56
2010/0192224 A1 7/2010 Ferri et al.
2018/0159896 A1 6/2018 Soman et al.

OTHER PUBLICATIONS

Perrotta, Raffaello, and Feng Hao. "Botnet in the browser: Understanding threats caused by malicious browser extensions." IEEE security & Privacy 16.4 (2018): 66-81. (Year: 2018).*
International Search Report, dated Jun. 19, 2020, from corresponding International Application No. PCT/US2020/021902.
Written Opinion of the International Searching Authority, dated Jun. 19, 2020, from corresponding International Application No. PCT/US2020/021902.

* cited by examiner

SYSTEMS AND METHODS FOR ZERO-FOOTPRINT EMAIL AND BROWSER LIFECYCLE

BACKGROUND OF THE INVENTION

1. Field of the Invention

The present invention generally relates to systems and methods for zero-footprint email and browser lifecycle, dependency, and configuration management.

2. Description of the Related Art

Email and web browsers account for the majority of successful compromises in any size organization within any industry. Securing email and web browsing requires maintaining current software and their dependencies, as well as their required configurations, in a managed, persistent state. This persistent nature greatly increases the susceptibility of an organization to an attack, as clever attackers can leverage known vulnerabilities with known exploits, known vulnerabilities with unknown exploits, and unknown vulnerabilities and unknown exploits against these persistent state software.

As software and their dependency requirements increase, it is difficult to secure and manage the lifecycle of the persistent email/browser software and their dependencies, further increasing the risk for an attack.

SUMMARY OF THE INVENTION

Systems and methods for zero-footprint email and browser lifecycle, dependency, and configuration management are disclosed. In one embodiment, in an information processing apparatus comprising at least one computer processor, a method for implementing zero-footprint email and browser lifecycle management may include: (1) launching a restricted sandbox with no dependencies installed; (2) executing an email client or browser session with no dependencies in the restricted sandbox; (3) receiving a request for a dependency from the email client or browser; (4) halting initialization of the request; (5) validating the request; (6) retrieving an approved configuration for the dependency; (7) resuming initialization of the request; and (8) destroying contents of the restricted sandbox when the email client or browser session is complete.

In one embodiment, the request may be validated based on a configuration signature of the dependency, a vulnerability of the dependency, a source of the request, etc.

In one embodiment, the contents of the restricted sandbox that are destroyed may include a browser history, browser cookies, the approved payload, the dependency, the session, etc.

In one embodiment, the approved configuration for the dependency may differ from the dependency that was requested.

In one embodiment, the approved configuration for the dependency may be for a predetermined period of time, may be limited to a specific website or a specific user, etc.

According to another embodiment, a system for implementing zero-footprint email and browser lifecycle management may include a first electronic device hosting a restricted sandbox and a Just In Time client, and a second electronic device hosting a dependency management system. The first electronic device may launch the restricted sandbox with no dependencies installed, may execute an email client or browser session with no dependencies in the restricted sandbox, and may receive a request for a dependency from the email client or browser. The Just In Time client may halt initialization of the request. The dependency management system may validate the request. The In Time client may retrieve an approved configuration for the dependency, may resume initialization of the request, and may destroy contents of the restricted sandbox when the email client or browser session is complete.

In one embodiment, the dependency management system may validate the request based on a configuration signature of the dependency, a vulnerability of the dependency, a source of the request, etc.

In one embodiment, the Just In Time client may destroy at least one of a browser history, browser cookies, the approved payload, the dependency, and the session in the restricted sandbox.

In one embodiment, the approved configuration for the dependency may differ from the dependency that was requested.

According to another embodiment, in an information processing apparatus comprising at least one computer processor, a method for implementing zero-footprint email and browser lifecycle management may include: (1) launching a restricted sandbox with no dependencies installed; (2) executing an email client or browser session with no dependencies in the restricted sandbox; (3) receiving a request for a dependency from the email client or browser; (4) halting initialization of the request; (5) receiving denial of the request; (6) providing the denial in an notification or message; and (7) destroying contents of the restricted sandbox.

In one embodiment, the request may be denied in response to the requested dependency being unapproved. The unapproved requested dependency may have at least one known vulnerability.

In one embodiment, the request may be denied in response to a website making the request being unknown.

In one embodiment, the method may further include receiving a basis to appeal the denial, and automatically decisioning the appeal based on the basis. The decisioning may approve limited access to the requested dependency. The limited access may be for a predetermined period of time or limited to a specific website or a specific user.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are directed to systems and methods for zero-footprint email and browser lifecycle, dependency, and configuration management.

In embodiments, a highly restricted email/browser with no software and/or dependencies may be launched into a restricted, sandboxed environment. The email/browser may be coupled with a just-in-time ("JIT") client, such as a Dependency Detection and Management Client, inside the sandbox.

As the user email/browses resources, the JIT client may detect and halt calls for dependency initialization. The JIT client may send an access validation request to a configuration management system ("CMS"). The CMS may then evaluate the access validation request. If the request is approved, the CMS responds with configurations and dependency payload information, which ensures the most recent approved configuration and dependencies are utilized. If the access validation request is denied, a failure notification may be provided. optional failure messaging and content may be included.

The JIT client processes the access validation response. In cases where the access validation request has been approved, the JIT client may process the configuration and payload information to ensure required settings and approved dependencies are applied inside the sandbox containing the browser, and then may resume dependency initialization. If the access validation request was denied, the JIT client may block dependency initialization and may present a failure message or other content to the user.

Upon termination of the browser, the sandbox and/or the contents of the sandbox may be destroyed. Destruction of the sandbox may include destruction of the browser instance, as well as configuration changes, and installed dependencies. The state of the browser software may be returned to its original state prior to process initiation.

Figure 1:
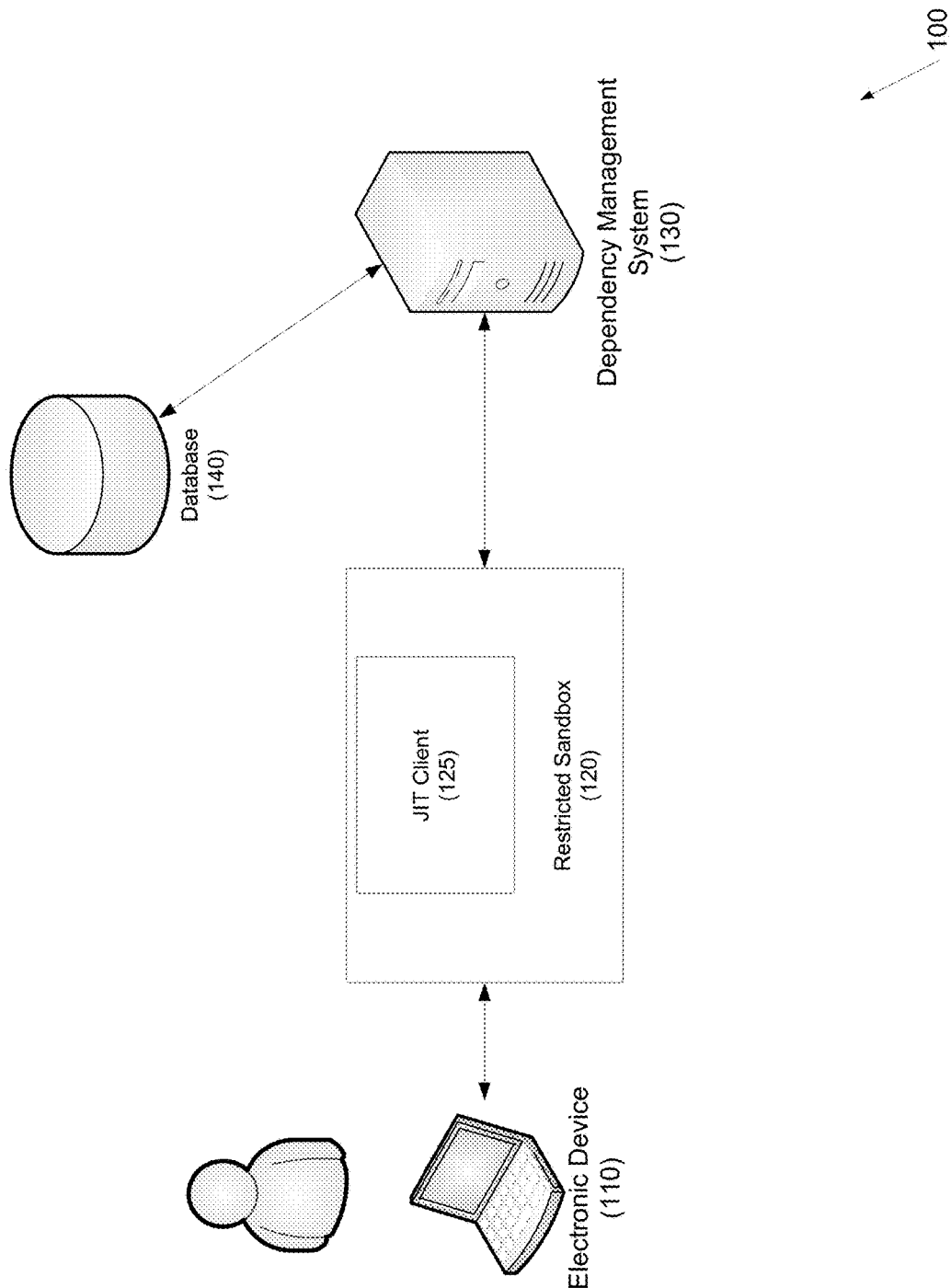
FIG. 1 depicts a system for zero-footprint email and browser lifecycle, dependency, and configuration management according to one embodiment.

Referring to FIG. 1, a system for zero-footprint email and browser lifecycle, dependency, and configuration management is disclosed according to one embodiment. System 100 may include electronic device 110, which may be a computer (e.g., laptop, notebook, desktop, workstation, tablet, etc.), an Internet of Things ("IoT") device, a kiosk, a network access device, etc.

Electronic device 110 may enable a user to launch an email session or browser session in restricted sandbox 120.

Electronic device 110 may interface with restricted sandbox 120, which may be hosted on a computing device, such as a server, in the cloud, etc. In one embodiment, the restricted sandbox 120 may be hosted on a device that is different from electronic device 110.

Restricted sandbox 120 may host the email or browser session.

Restricted sandbox 120 may host Just In Time (JIT) client 125, which may interface with dependency management system 130. JIT client 125 may identify a dependency in the email or browser session, and may halt the dependency initialization. It may then submit an access validation request to dependency management system 130.

In one embodiment, JIT client 125 may be an agent that runs inside restricted sandbox 120 and waits to intercept any email and/or browser dependency calls. JIT client 125 may halt the dependency process call, and may then determine the next steps, if initialization is allowed. JIT client 125 may further manage the installation of any payload and any configuration required.

Dependency management system 130 may receive the access validation request and may approve or deny the request. For example, dependency management system 130 may evaluate the validation request to identify the approved configuration required for the dependency, and may provide the approved configuration as a payload to its response. If no approved configuration is available, or if the request is suspect, the validation request may be denied.

Examples of situations in which a request may be denied include a request from a website that has not been validated or approved for use of dependency (e.g., the unsafe web site MalaciousSite.com request requires Java 1.8.x dependency to run a function on the web site); a website requesting an older vulnerable version of dependency that is not approved for use (e.g., a web site requires Java 1.6.x dependency that has known vulnerabilities and the approved version is Java 1.8.x). Other situations that require denial of the request may be considered as is necessary and/or desired.

In one embodiment, the request may be validated by validating the user, the website/email that is making the request, and the dependency that is requested. The dependency being requested may be based on a signature of known dependencies. For example, a website calling for Java 1.6.x may have a unique signature for this call that may be mapped and identified by the validation process. Unidentified dependencies may be recorded and eventually mapped to a dependency.

In one embodiment, machine learning may be used to automatically validate and approve unknown websites and/or dependencies based on safe and/or unsafe patterns defined. For example, a known website may make a call for a new Java release, but there is no data on the new Java release. Many known users, however, may be visiting the known website. Machine learning may be used to determine that the new Java release is likely safe and the request should be allowed.

Database 140 may store data, including, for example, configuration data, dependency information, configuration signatures, user and/or machine identification data, etc.

Figure 2:
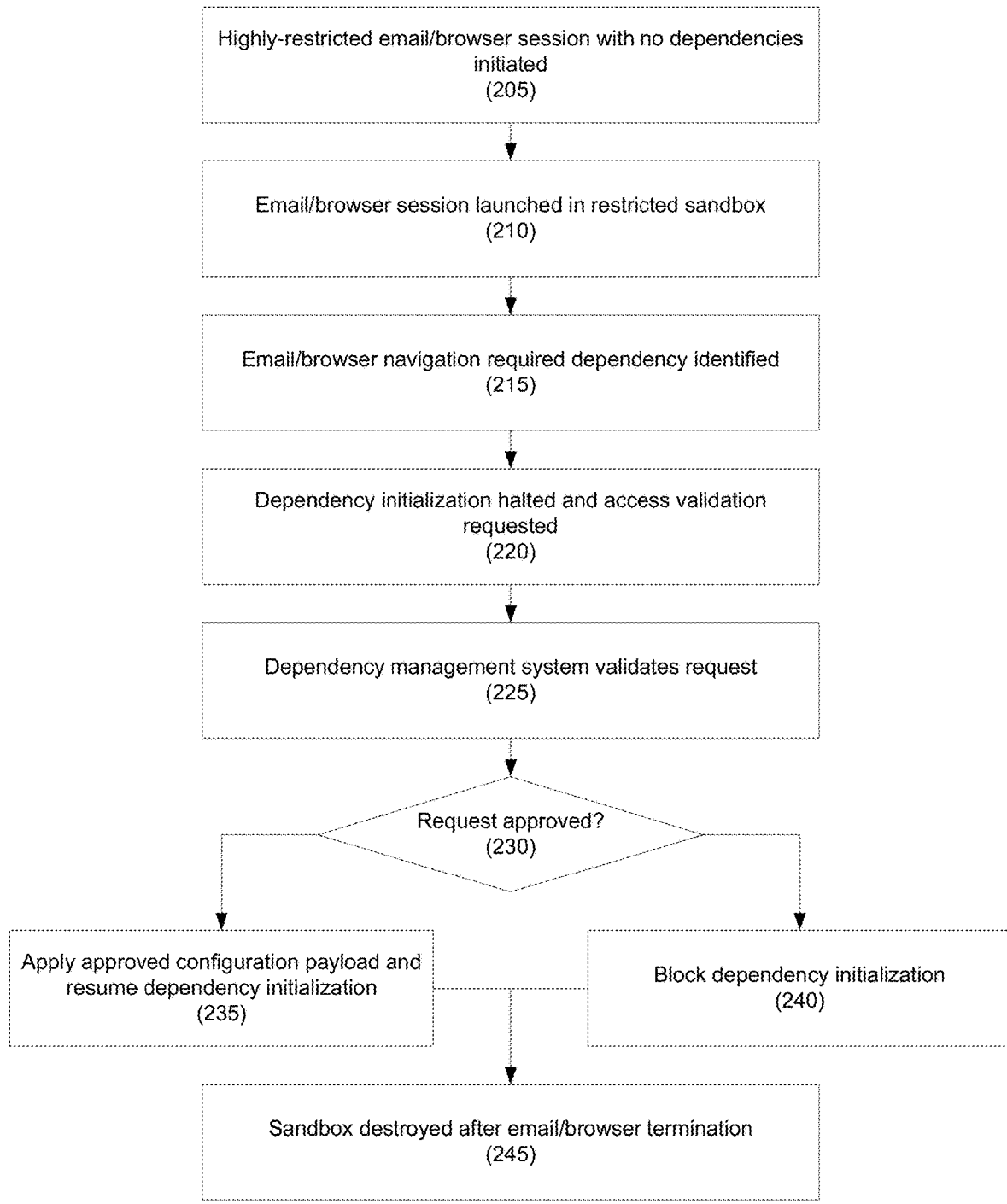
FIG. 2 depicts an method for zero-footprint email and browser lifecycle, dependency, and configuration management according to one embodiment.

Referring to FIG. 2, a method for zero-footprint email and browser lifecycle, dependency, and configuration management is disclosed according to one embodiment.

In step 205, a user may request an email or browser session on an electronic device, such as a computing device, a network access device, etc.

In step 210, the email or browser session is launched in a restricted sandbox. In one embodiment, applications may be installed inside the restricted sandbox using a predefined process, such as application packaging, installation, etc. The process defined may pull existing applications, such as a web browser, email client, etc. that are already found on the system into the restricted sandbox.

For example, a web browser is part of the device's operating system, but is not installed within the restricted sandbox. Instead, embodiments may launch an empty sandbox with nothing installed. After launch of the sandbox, the web browser may be called from within the sandbox, which then pulls the web browser into the restricted environment. While the application is in the restricted sandbox, it operates like it any other software that would normally be installed in the sandbox.

In step 215, one or more dependency requested in the email session or browser navigation may be identified. For example, a JIT client, which may be constantly running inside the sandbox waiting to intercept any email or browser dependency calls, may identify the request.

In step 220, the dependency initialization may be halted, and a request for access validation for the dependency may be sent to, for example, a dependency management system. For example, the JIT client executed in the restricted sandbox may halt the process call and determine the next steps, if initialization is allowed, and installation of any payload and configuration required.

In step 225, the dependency management system may validate the request. For example, the dependency management system may identify an authorized configuration for the request. The authorized configuration may be returned with the response to the request.

In one embodiment, the dependency may be pre-defined. For example, configuration signatures of dependencies and their relationship to websites and/or email may be defined, and the configuration signatures may be used to determine if a request is approved or denied.

In step 230, if the request is approved, in 235, the authorized configuration payload may be applied to the email or browser session, and the dependency initialization may be resumed. When the email or browser session is terminated, in step 245, the sandbox may be destroyed.

In one embodiment, everything in the restricted sandbox is destroyed, including user configurations such as browser history, cookies, payload, configuration, dependency, and session. The state of the machine may be reverted to the base state right before the user launched the browser or email.

If, in step 230, the request is not approved, such as if the website making the request has not been validated or approved for use of the dependency, if the website requests an older, vulnerable version of the dependency that is not approved for use, etc., the dependency initialization is blocked, and a message or notification may be provided informing the user of such.

In one embodiment, the user may be prompted, in real-time or substantially in real-time, to provide a basis to appeal the rejection. The appeal process may be an automated process, and, if approved, the next time the user attempts access, access would be granted to only that user for that website and dependency. In one embodiment, machine learning may be used to expedite the appeal and/or approval process.

In another embodiment, limited access to the dependency may be provided. For example, if the dependency is required and an upgraded version cannot be used, an exception may be made for the user, website, etc. In one embodiment, the exception may be time and/or use limited.

A non-limiting example of an implementation of the process described in FIG. 2 is as follows. After a highly restricted session with no dependencies is launched (e.g., step 205) and an email session is launched in the restricted sandbox (e.g., step 210), an email client may request a reader in order to open a pdf document (e.g., step 215). The JIT client intercepts the call for the reader and halts execution (e.g., step 220). It then validates the proper reader (e.g., step 225). After approval, the JIT client installs and configures the proper reader, and continues execution by opening the PDF in the reader (e.g., step 235). At the conclusion of the session, the sandbox is destroyed (e.g., step 245).

Another non-limiting example of an implementation of the process described in FIG. 2 is as follows. A user requires access to a website and vulnerable dependency to do his or her job. The website, however, requires a vulnerable version of Java 1.6.x; it cannot use an upgraded version as it will break critical business functionalities of the website. The JIT client may approve user access to the website and vulnerable dependency (Java 1.6.x), while restricting that access to only that user, the computer, website and specific vulnerable version.

In this example, the JIT client may handle a vulnerable version of a dependency that is required and cannot be upgraded. Embodiments may limit the exposure to the vulnerability and risk while still providing the user access to perform his or her business functions.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, from automated scheduling, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, Phyton, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for implementing zero-footprint email and browser lifecycle management, comprising:
    in an information processing apparatus comprising at least one computer processor:
        launching a restricted sandbox having no dependencies installed therein;
        executing an email client or browser session with no dependencies in the restricted sandbox;
        receiving a request for a dependency from the email client or browser;
        halting initialization of the request;
        validating the request;
        retrieving an approved configuration for the dependency;
        resuming initialization of the request; and
        destroying contents of the restricted sandbox when the email client or browser session is complete.

2. The method of claim 1, wherein the request is validated based on a configuration signature of the dependency.

3. The method of claim 1, wherein the request is validated based on a vulnerability of the dependency.

4. The method of claim 1, wherein the request is validated based on a source of the request.

5. The method of claim 1, wherein the contents of the restricted sandbox that are destroyed include at least one of a browser history, browser cookies, the approved configuration, the dependency, and the session.

6. The method of claim 1, wherein the approved configuration for the dependency differs from the dependency that was requested.

7. The method of claim 1, wherein the approved configuration for the dependency is for a predetermined period of time.

8. The method of claim 1, wherein the approved configuration for the dependency is limited to a specific website or a specific user.

9. A system for implementing zero-footprint email and browser lifecycle management, comprising:
    a first electronic device hosting a restricted sandbox and a Just In Time client; and
    a second electronic device hosting a dependency management system;
    wherein:
        the first electronic device launches the restricted sandbox with no dependencies installed;
        the first electronic device executes an email client or browser session with no dependencies in the restricted sandbox;
        the first electronic device receives a request for a dependency from the email client or browser;
        the Just In Time client halts initialization of the request;
        the dependency management system validates the request;
        the Just In Time client retrieves an approved configuration for the dependency;
        the Just In Time client resumes initialization of the request; and
        the Just In Time client destroys contents of the restricted sandbox when the email client or browser session is complete.

10. The system of claim 9, wherein the dependency management system validates the request based on a configuration signature of the dependency.

11. The system of claim 9, wherein the dependency management system validates the request based on a vulnerability of the dependency.

12. The system of claim 9, wherein the dependency management system validates the request based on a source of the request.

13. The system of claim 9, wherein the Just In Time client destroys at least one of a browser history, browser cookies, the approved configuration, the dependency, and the session in the restricted sandbox.

14. The system of claim 9, wherein the approved configuration for the dependency differs from the dependency that was requested.

15. A method for implementing zero-footprint email and browser lifecycle management, comprising:
    in an information processing apparatus comprising at least one computer processor:
        launching a restricted sandbox with no dependencies installed;
        executing an email client or browser session with no dependencies in the restricted sandbox;
        receiving a request for a dependency from the email client or browser;
        halting initialization of the request;
        receiving denial of the request;
        providing the denial in a notification or message; and
        destroying contents of the restricted sandbox.

16. The method of claim 15, wherein the request is denied in response to the requested dependency being unapproved.

17. The method of claim 16, wherein the unapproved requested dependency has at least one known vulnerability.

18. The method of claim 15, wherein the request is denied in response to a website making the request being unknown.

19. The method of claim 15, further comprising:
    receiving a basis to appeal the denial; and
    automatically decisioning the appeal based on the basis;
    wherein the decisioning approves limited access to the requested dependency.

20. The method of claim 19, wherein the limited access is for a predetermined period of time or limited to a specific website or a specific user.

\* \* \* \* \*